(12) United States Patent
Kuperman et al.

(10) Patent No.: US 11,868,227 B2
(45) Date of Patent: Jan. 9, 2024

(54) UNIFICATION OF DISPARATE CLOUD RESOURCES USING MACHINE LEARNING

(71) Applicant: CAST AI Group, Inc., North Miami Beach, FL (US)

(72) Inventors: Leonid Kuperman, Tarzana, CA (US); Laurent Gil, Miami, FL (US)

(73) Assignee: CAST AI Group, Inc., North Miami Beach, FL (US)

( * ) Notice: Subject to any disclaimer, the term of this patent is extended or adjusted under 35 U.S.C. 154(b) by 304 days.

(21) Appl. No.: 17/321,856

(22) Filed: May 17, 2021

(65) Prior Publication Data

US 2021/0365348 A1 Nov. 25, 2021

Related U.S. Application Data

(60) Provisional application No. 63/029,104, filed on May 22, 2020.

(51) Int. Cl.
*G06F 11/34* (2006.01)
*G06F 11/32* (2006.01)
*G06N 20/00* (2019.01)
*G06F 11/30* (2006.01)

(52) U.S. Cl.
CPC ...... *G06F 11/3428* (2013.01); *G06F 11/3006* (2013.01); *G06F 11/3075* (2013.01); *G06F 11/328* (2013.01); *G06N 20/00* (2019.01)

(58) Field of Classification Search
CPC ............. G06F 11/3006; G06F 11/3075; G06F 11/328; G06F 11/3428; G06F 11/3447; G06N 20/00

USPC .......................................................... 702/186
See application file for complete search history.

(56) References Cited

U.S. PATENT DOCUMENTS

| | | | |
|---|---|---|---|
| 2015/0341229 A1* | 11/2015 | Richter | .................. H04L 67/10 709/224 |
| 2017/0261949 A1 | 9/2017 | Hoffmann et al. | |
| 2018/0137027 A1 | 5/2018 | Breitgand et al. | |
| 2019/0149424 A1 | 5/2019 | O'Neill et al. | |
| 2021/0150411 A1* | 5/2021 | Coenders | ................ G06F 21/53 |

OTHER PUBLICATIONS

International Search Report and Written Opinion, Patent Cooperation Treaty Application No. PCT/US2021/033121, dated Aug. 16, 2021, 18 pages.

* cited by examiner

*Primary Examiner* — John H Le
(74) *Attorney, Agent, or Firm* — Fenwick & West LLP

(57) ABSTRACT

A device launches a respective instance on each respective cloud service provider (CSP) of a plurality of CSPs. The device receives, from each respective instance, performance benchmark data for each CSP shape of the respective CSP on which the respective instance is launched. The device inputs the performance benchmark data from each respective instance into a model and receives, as output from the model, a determination of, for each CSP shape, group of a plurality of groups to which the CSP shape belongs. The device ranks each group based on a parameter, and provides for display to a user a recommended CSP shape based on the ranking.

20 Claims, 8 Drawing Sheets

Recommendations - 30    600    [CAST AI choice ▼]

Digital Ocean   ( BEST PRICE )   ( CAST AI CHOICE )     $ 16.29 per month
vCpu: 3  RAM: 1 GB

| Type: s-3vcpu-1gb | Data center: New York 3 | Performance: 34.22% | Endurance: 97.69% |
| Type: s-3vcpu-1gb | Data center: New York 1 | Performance: 34.22% | Endurance: 97.69% |

---

Oracle Infrastructure ( BEST PERFORMANCE )     $ 73.00 per month
vCpu: 4  RAM: 63 GB

| Type: VM.Standard.E3.Flex4 | Data center: US East (Ashburn) | Performance: 100.00% | Endurance: 96.56% |

---

Digital Ocean     $ 43.45 per month
vCpu: 4  RAM: 8 GB

| Type: s-4vcpu-8gb | Data center: New York 3 | Performance: 48.42% | Endurance: 97.95% |
| Type: s-4vcpu-8gb | Data center: New York 1 | Performance: 48.42% | Endurance: 97.95% |

---

Oracle Infrastructure     $ 87.60 per month
vCpu: 4  RAM: 31 GB

| Type: VM.Standard.E2.4 | Data center: US East (Ashburn) | Performance: 71.65% | Endurance: 99.92% |

---

Google Cloud     $ 72.23 per month
vCpu: 4  RAM: 4 GB

| Type: e2-highcpu-4 | Data center: Moncks Corner, South Carolina, USA | Performance: 34.15% | Endurance: 99.78% |

FIG. 6

UNIFICATION OF DISPARATE CLOUD RESOURCES USING MACHINE LEARNING

CROSS REFERENCE TO RELATED APPLICATIONS

This application claims the benefit of U.S. Provisional Application No. 63/029,104, filed May 22, 2020, the disclosure of which is hereby incorporated by reference herein in its entirety.

TECHNICAL FIELD

The disclosure generally relates to the field of cloud resources, and more particularly relates to benchmarking Cloud Service Provider (CSP) shape performance for evaluation.

BACKGROUND

Many CSPs exist today that offer cloud resources as a service. However, it is difficult to determine how a cloud service provider's offered cloud shapes will perform on a given task because of a lack of data transparency, as cloud providers typically publish limited data, such as a number of Virtual CPU's (vCPU) offered by each cloud provider shape, without providing any other information. Yet further, CSPs provide their own naming conventions for compute shapes. For example, Amazon Web Services™ (AWS) may call a computer M4.4XLARGE; however, a user is unable to determine using that name a relative equivalent in other cloud service provider environments, such as in Microsoft Azure™. Thus, it is difficult or impossible for users to determine the relative advantages of cloud resources offered by one cloud provider as compared to another.

Additionally, cloud providers may use different underlying chipsets that drive the vCPUs offered in compute shapes. For example, cloud providers may use AMD™ or Intel™ chips, and across just those 2 manufacturers there are many varieties of chip models that vary in terms of capabilities, rendering vCPU count a poor proxy for performance. As another example, cloud providers offer a varying amount of memory per cloud provider shape. For example, AWS™ may offer 2 vCPU's with 4 GB of Random Access Memory (RAM) while GPC™ may offer compute instances with 2 vCPU's and 8 GB of RAM, and it may not be transparent to an end user which of these configurations is in place. As another example of inadequate information, AWS™ for example created a proprietary measure named "ECPU". An ECPU is defined as "One EC2 compute unit is similar in power to a 1.0-1.2 GHz 2007 Intel Xeon™ or AMD Opteron™ processor". The definition of ECPU is imprecise and more importantly, unrelatable for modern cloud users.

To further complicate how cloud users' reason about CSP shapes, many cloud providers offer a variable performance model for certain types of shapes. For example, AWS™ offers "burstable performance" shapes include the T2, T3, T3a families of shapes. These compute shapes accumulate credits during periods of lower usage, allowing CPU to spike for periods of time when workloads require more computing power. This leads to an inconsistency in CPU capability over time. Each cloud provider offers different formulas for burstable shapes, making it difficult to compare results between shapes within and across multiple cloud providers.

SUMMARY

Systems and methods are disclosed herein for categorizing and benchmarking performance of various offerings of cloud providers. The system may cluster cloud provider offerings into functional equivalents, either generally, or for a given purpose. Among other advantages, this enables users of cloud providers to identify advantages and disadvantages of various providers, and enables an optimization engine to output a recommended best cloud provider offering for a user's need.

In an embodiment, a CSP shape evaluation tool launches a respective instance on each respective cloud service provider (CSP) of a plurality of CSPs. The CSP shape evaluation tool receives, from each respective instance, performance benchmark data for each CSP shape of the respective CSP on which the respective instance is launched. The CSP shape evaluation tool inputs the performance benchmark data from each respective instance into a model, and receives, as output from the model, a determination of, for each CSP shape, group of a plurality of groups to which the CSP shape belongs. The CSP shape evaluation tool ranks each group based on a parameter, and provides for display to a user a recommended CSP shape based on the ranking.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 6 illustrates one embodiment of an exemplary user interface showing recommendations of CSP shapes based on the search terms.

DETAILED DESCRIPTION

Figure 1:
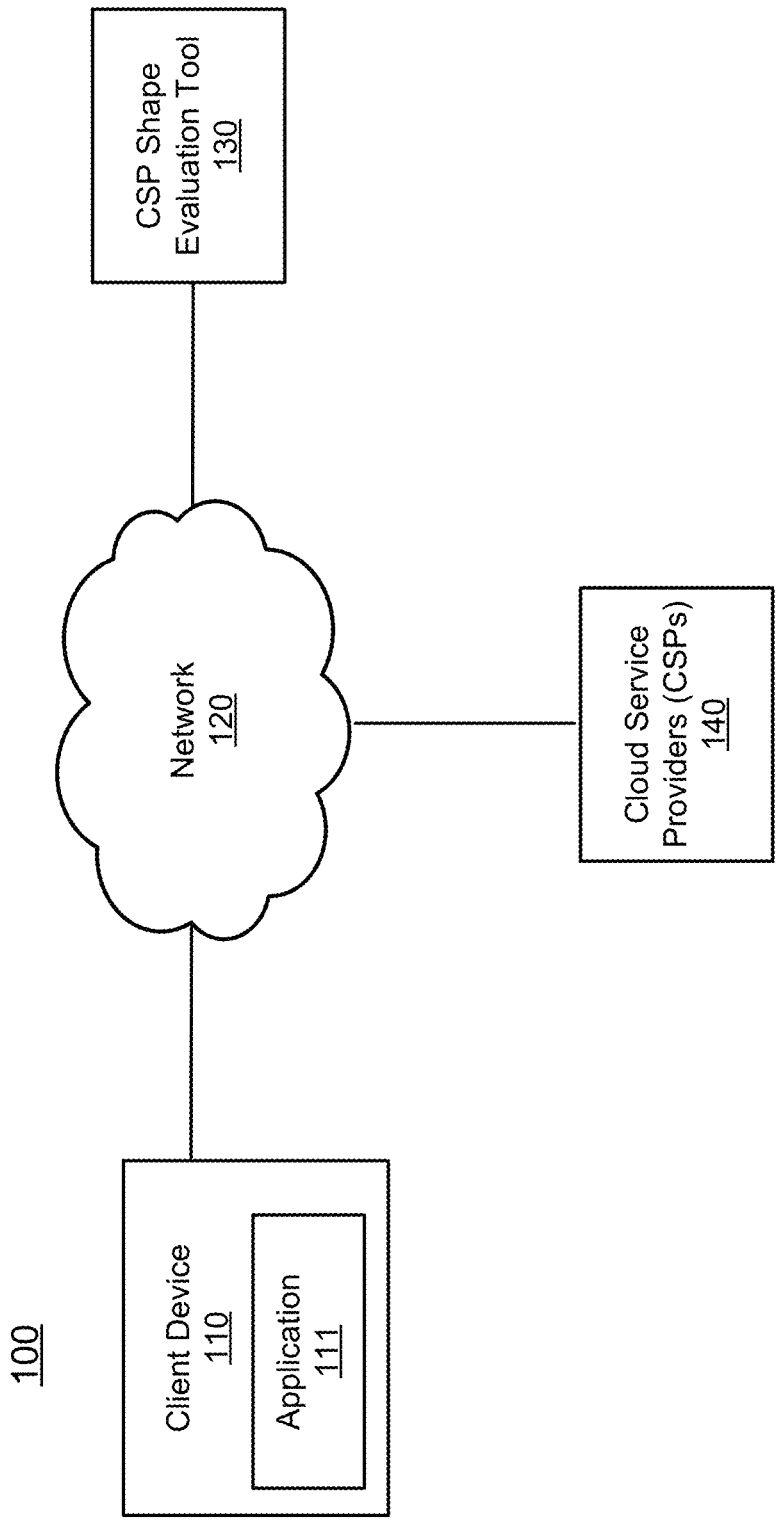
FIG. 1 illustrates one embodiment of a system environment implementing a CSP shape evaluation tool.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

CSP Shape Evaluation Tool Introduction

The term CSP, as used herein, may refer to an enterprise that provides Infrastructure as a Service such as compute, storage and network. CSPs may also provide higher-order services such as database, messaging, search, Machine Learning, CDN, data processing, etc. The term CSP shape, as used herein, may refer to a published specification for a virtual machine (VM) that can be ordered from a specific CSP. A cloud provider shape will typically specify some limited information, such as the number and type of virtual CPU's (vCPU), the amount of available Random Access Memory (RAM) and/or other attributes of the provided VM. Table 1, below, shows examples of CSP shapes, including some exemplary published specifications.

TABLE 1

Exemplary CSP Shapes

| Shape Name | vCPU's | Memory (GB) | Cost (USD)/ Hour |
|---|---|---|---|
| AWS Instances | | | |
| a1.medium | 2 | 4 | 0.0510 |
| t3.2xlarge | 8 | 32 | 0.3328 |
| M5.8xlarge | 32 | 128 | 1.5360 |
| ... | | | |
| Google Public Cloud Instances | | | |
| n1-standard-2 | 2 | 7.5 | 0.0632 |
| e2-highcpu-4 | 4 | 4 | 0.1003 |
| n1-highcpu-8 | 8 | 7 | 0.3236 |
| ... | | | |
| Microsoft Azure Instances | | | |
| Standard_F4s_v2 | 4 | 8 | 0.1713 |
| Standard_D4as_v4 | 4 | 16 | 0.1946 |
| Standard_DS4_v2 | 8 | 27 | 0.5931 |
| ... | | | |

As can be seen, the exemplary CSP shapes include very little information about the technology that underlies published capabilities (as depicted, vCPU and memory capabilities). The potential variation in performance may create a captivity problem for an enterprise, where if an enterprise wishes to migrate from one CSP to another, the enterprise does not have sufficient information to select a CSP shape that is sure to be adequate for the enterprise's needs. These variations in performance make it very difficult for organizations to move workloads between clouds. Cloud users must estimate the types of computers required based on what each cloud provider reveals about their computer shapes. The CSP shape evaluation tool disclosed herein removes the need to rely on the information published by CSPs, and provides a more robust data set to drive recommendations of and selections of CSP shapes. The term workload, as used herein, may refer to an application that runs on a computer instance and may include required storage and network capabilities from a CSP. A workload may be a traditional application hosted on a virtual machine (Cloud Provider Shape) or a Cloud Native container-based application. The term container, as used herein, may refer to small application footprint that includes the application itself along with all of the required library dependencies to run. A container may require a container engine such as DOCKER to execute.

After obtaining benchmarking data, the system may apply a combination of statistical analysis and machine learning techniques to group each CSP shape into a Cast Shape. The term cast shape, as used herein, may refer to a virtual specification of a Virtual Machine computing unit. Cast Shapes include similarly capable computing shapes across CSP boundaries (e.g., include groupings of CSP shapes as determined by the grouping module of the CSP shape evaluation tool). Cast shapes may be categorized into a small number of groups, where each known CSP shape fit into one of the groups, and where the groups may be predefined. In an exemplary and non-limiting embodiment, cast shapes may include groupings of Extra Small, Small, Medium, Large, Extra Large and Double Extra Large. Cast shapes could similarly be described in any manner that is convenient, such as on a numeric scale (e.g., of 0 to N (N=integer) such as 0 to 6). The number of computer groups defined by Cast Shape is arbitrary, but in an embodiment is designed to be low (e.g., less then 10) for interpretability. This grouping allows users of the system to understand like-performing compute instances across all CSP's.

CSP Shape Evaluation Tool System Environment

FIG. 1 illustrates one embodiment of a system environment implementing a CSP shape evaluation tool. As depicted in FIG. 1, environment 100 includes client device 110 having application 111 installed thereon, network 120, CSP shape evaluation tool 130, and CSPs 140. Client device 110 may be any device operable by a user to interface with CSP shape evaluation tool 130. Exemplary client devices include smartphones, tablets, and personal computers, though any client device capable of interfacing with a user in any manner described herein is a client device.

Application 111 may be a dedicated application provided (either directly, or indirectly (e.g., via an app store)) by CSP shape evaluation tool 130, or may be an application accessed using a browser of client device 110 (e.g., hosted by one or more servers of CSP shape evaluation tool 130). Application 111 may be used to output information to the user (e.g., via a display, speakers, etc.) and receive input from the user (e.g., via voice, keyboard, touchpad, or any other inputs). For example, application 111 may be used to present CSP shape recommendations to the user, and may be used to receive search terms from the user for querying for CSP shape recommendations. Further discussion of such search functionality is described below with reference to FIGS. 2, 3, 5, and 6.

Network 120 may be any network capable of transmitting data communications between any entity shown in FIG. 1 or described herein. Exemplary networks that network 120 may embody include the Internet, a local area network (LAN), a wide area network (WAN), WiFi, Bluetooth, and any other type of network.

CSP shape evaluation tool 130 evaluates CSP shapes available from CSPs 140, and provides recommendations to users of client device 110 of CSP shapes based on input from the users. Further details about how CSP shape evaluation tool 130 achieves these functions is described below with respect to FIGS. 2 and 3, among other figures.

CSP Shape Evaluation Tool—Exemplary Architecture

Figure 2:
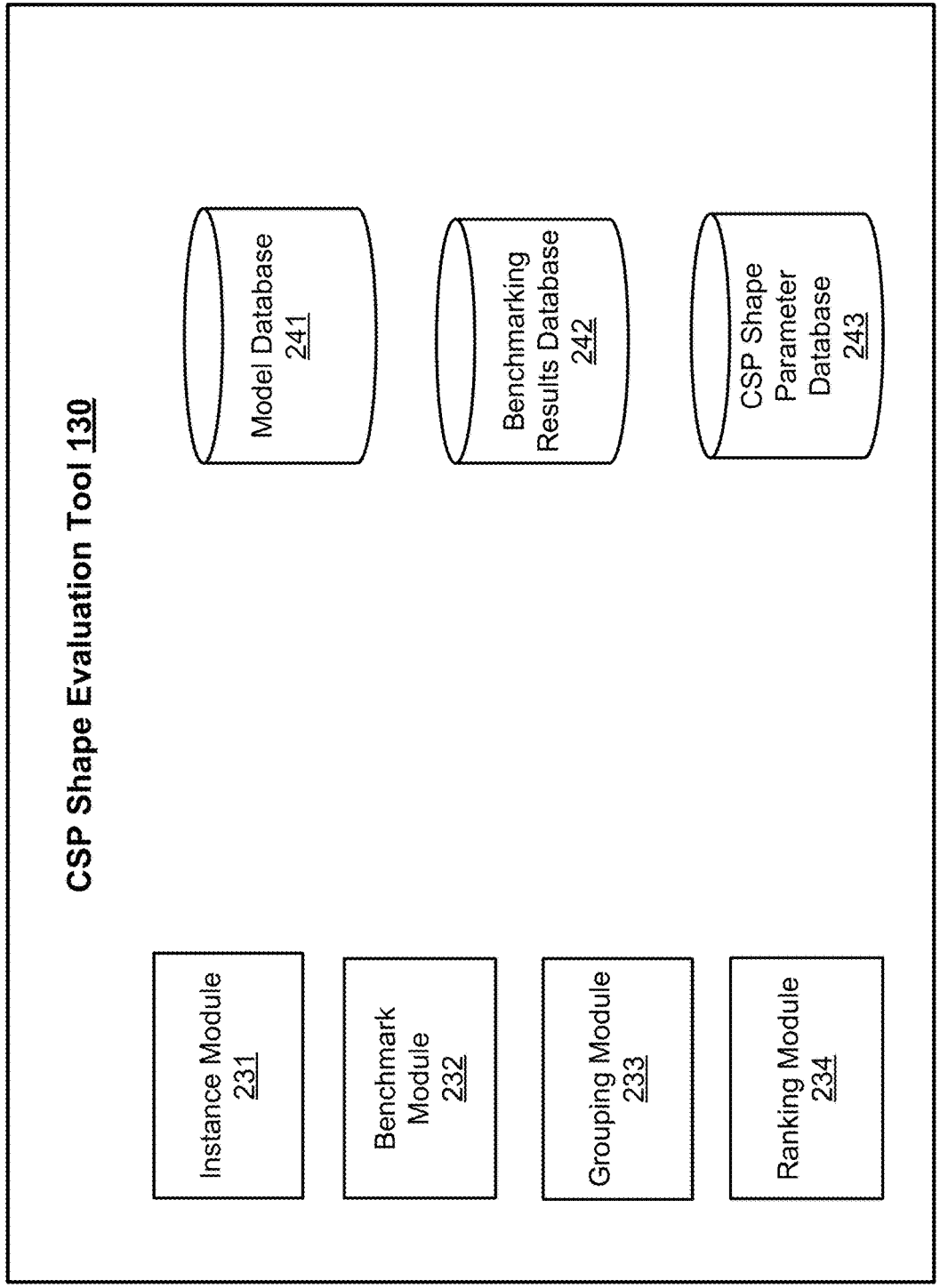
FIG. 2 illustrates one embodiment of exemplary modules and databases used by the CSP shape evaluation tool.

FIG. 2 illustrates one embodiment of exemplary modules and databases used by the CSP shape evaluation tool. As depicted in FIG. 2, CSP shape evaluation tool 130 includes instance module 231, benchmark module 232, grouping module 233, ranking module 234, model database 241, benchmarking results database 242, and CSP shape parameter database 243. The modules and databases shown in FIG. 2 are merely exemplary, and fewer or additional modules may be used to achieve the functionality disclosed herein. Moreover, some or all of the activity of CSP shape evaluation tool 130 may be distributed to other devices (e.g., to application 111 of client device 110).

Instance module 231 launches one or more instances on one or more CSPs for the purpose of testing CSP shape performance. To launch an instance, instance module 231 transmits a command to a given CSP to launch a given CSP shape. In some embodiments, instance module 231 may launch two separate instances for benchmarking of a same CSP shape in order to perform specific measurements. Further details of the instances themselves and how they perform after launch are described in further detail below with respect to FIG. 3.

Benchmark module 232 transmits instructions to the instances to perform measurement tasks. Benchmark module 232 receives, from the instances, performance benchmark data for each CSP shape of the respective CSP on which the respective instance is launched, the performance benchmark data being for each measurement performed on a given CSP shape. While many benchmark measurements can be performed with one launched instance, some benefit from launching an additional testing instance. Further mechanics of benchmarking are described with respect to FIG. 3 below. Table 2 below describes exemplary and non-limiting various performance attributes that are benchmarked, whether they would be improved by use of a testing instance, and an exemplary description of a performance test for each given attribute.

TABLE 2

Exemplary Performance Attributes

| Performance Attribute | Use Additional Testing Instance? | Description |
|---|---|---|
| Integer Arithmetic | No | This benchmark tests basic integer arithmetic that does not require the use of decimals. Integers can fit into 2- or 4- byte representation. CPU's have specialized instruction sets to deal with integer operations. This benchmark looks at how many fixed operations can be performed in a given time, and the data is normalized to operations per second. |
| Floating Point Arithmetic | No | This benchmark tests floating point arithmetic with high decimal precision. In the C programming language floating point numbers can fit into 4-, 8- and 10- byte representations. CPU's have specialized instruction sets to deal with floating point operations. This benchmark looks at how many fixed operations can be performed in a given time, and the data is normalized to operations per second. |
| Cryptographic Operations | No | This benchmark looks at cryptographic operations such as common hashing and encryption algorithms. These algorithms have typically been optimized for performance through open source tools such as openssl. This benchmark looks at how many cryptographic operations can be performed in a given time, and the data is normalized to operations per second. |
| Memory Operations | No | This benchmark looks at overall memory speed. Memory allocation, memory read, and memory write operations are considered. The benchmark attempts to allocate and fill large memory blocks while the operation is being timed. This benchmark looks at the rate of memory allocation, reading and writing in a given time, and the data is normalized to operations per second. |
| Threaded Operations | No | This benchmark correlates performance to the number of reported CPU's of a launched instance. Each vCPU or Computer Core should be able to process work in parallel without requiring the operating system to schedule work for parallel threads and context switch between each scheduled workload. |
| Boot Volume Disk I/O | No | This benchmark looks at overall disk performance for the instance boot volume if one is provided by the CSP. Some shapes are not provided a writable boot volume, and all I/O must be performed through attached storage. When a writable boot volume is not provided, this benchmark result is not recorded as part of the instance data set. |

TABLE 2-continued

Exemplary Performance Attributes

| Performance Attribute | Use Additional Testing Instance? | Description |
|---|---|---|
| Attached Storage I/O | No | This benchmark measures I/O operations per second, and also records details such as read, write and seek times to determine disk latency. Similar to the boot volume benchmark, when creating an instance, the Benchmarking Control System (1) attaches external block volume storage to the instance. This benchmark measures I/O operations per second, and also records details such as read, write and seek times to determine disk latency. |
| Network Interface Performance | Yes | This benchmark uses an external testing instance to perform network performance and latency testing. The testing instance may be on the same LAN as the launched instance to ensure that the benchmark is not skewed for Wide Area Network (WAN) latency. This test measures the number of Bits per Second that can be transmitted between the launched instance and the testing instance. In addition to throughput, packet latency is also measured along with variation in latency over time. The last metric is referred to as network jitter. |
| Database Performance Mixed Workload Test | Yes | This benchmark is a database workload test which often correlates with a combination of lower level tests enumerated above. Database performance depends on CPU, Threading, Memory, Disk and Network performance in combination. This benchmark does not require the separation of database server (launched instance) and database client (test instance) however this separation is highly recommended to avoid client-side impact to performance results. In this benchmark the database client launches a series of SQL commands towards database server test for INSERT, UPDATE and SELECT performance under various data scenarios. |
| Web Application Performance Mixed Workload Test | Yes | This benchmark is a web application workload test which often correlates with a combination of lower level tests enumerated above. Web application performance depends on CPU, Threading, Memory, Disk and Network performance in combination. This benchmark does not require the separation of web application server (launched instance) and network client (test instance) however this separation is highly recommended to avoid client-side impact to performance results. In this benchmark, the network client launches a series of parallel HTTP(S) requests towards web application server to test for HTTP(S) throughput against a series of predefined application scenarios. |

Grouping module 233 determines a group that a given CSP shape belongs to given one or more dimensions of benchmark data. For example, categories may be generated that each correspond to a given set of benchmarked performance, and these categories may be used to standardize across different CSPs an expected level of performance. In order to determine the group, grouping module 233 inputs (e.g., optionally normalized versions of) the performance benchmark data from each respective instance into a model (e.g., a statistical model or a machine learning model), and receives, as output from the model, a determination of, for each CSP shape, group of a plurality of groups to which the CSP shape belongs. Further details about how grouping may be performed are provided below with reference to FIG. 4.

Ranking module 234 ranks each group based on a parameter (e.g., a parameter a user is interested in, such as performance on a given benchmark attribute, or a desired performance of a CSP shape), and provides for display to a user a recommended CSP shape based on the ranking. Further details about the ranking and display of a recommendation are described in further detail below with reference to FIGS. 5-6. Model database 241 holds models used by the system, such as those models used for grouping. Benchmarking results database 242 stores benchmark performance data. CSP Shape parameter database stores data corresponding given CSP shapes to different groups depending on a parameter specified by a user.

CSP Shape Evaluation Tool—Exemplary End-to-End System

Figure 3:
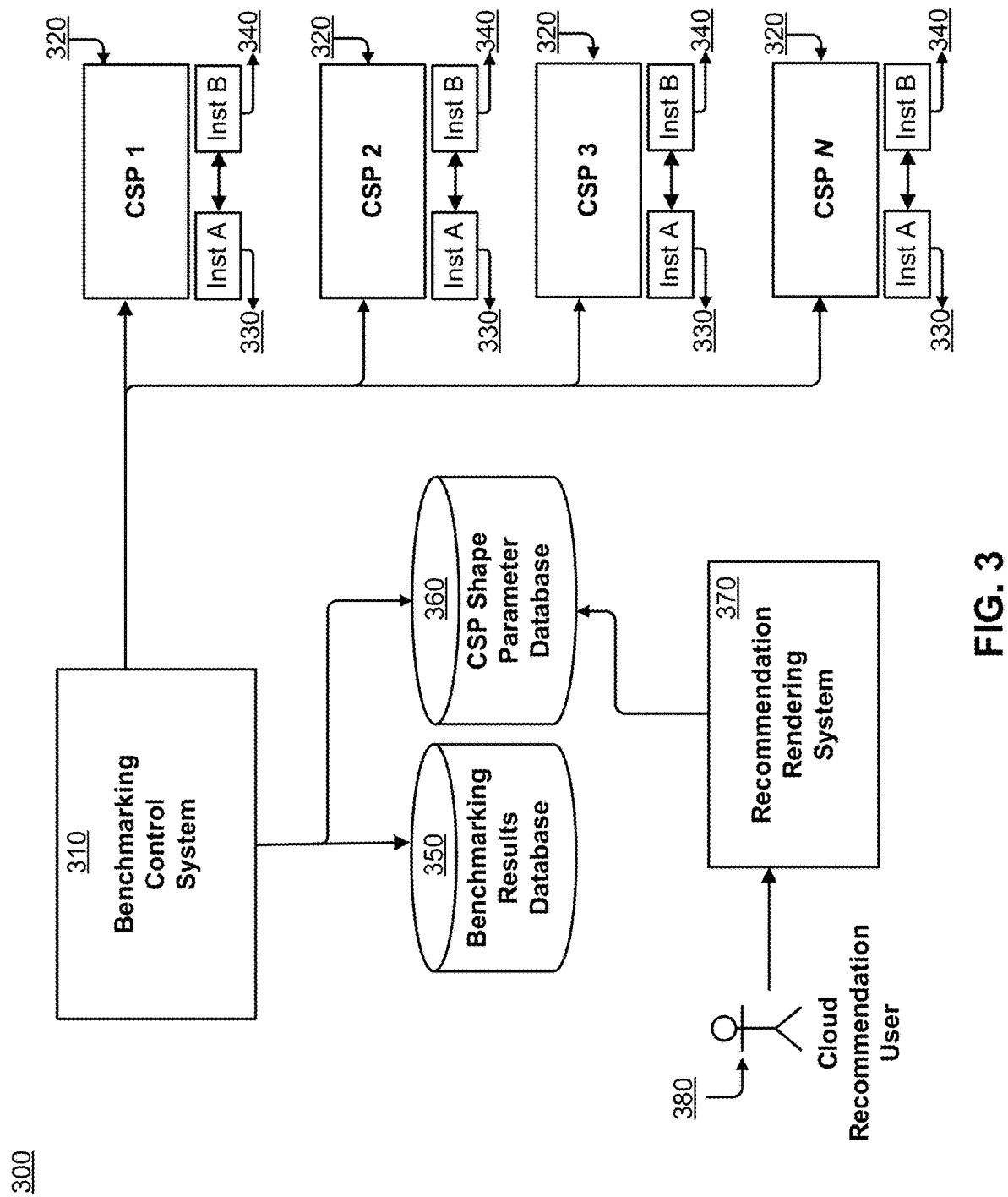
FIG. 3 illustrates one embodiment of an end-to-end system implementing the CSP shape evaluation tool.

FIG. 3 illustrates one embodiment of an end-to-end system implementing the CSP shape evaluation tool. Environment 300 includes activity of CSP shape evaluation tool 130, where benchmarking control system 310, benchmarking results database 350, CSP shape parameter database 360, and recommendation rendering system 370 are part of CSP shape evaluation tool 130. There are any number (N) of CSPs that are to be analyzed by benchmarking control system 310. Benchmarking control system 310 may be a sub-module of benchmark module 232, may be equivalent to benchmark module 232, or may be a module of which benchmark module 232 is a sub-module. Benchmarking control system 310 may identify the CSPs to be analyzed in any manner. In an embodiment, an administrator may manually input CSP addresses for use by benchmarking control system 310. Alternatively or additionally, benchmarking control system 310 may perform a web crawling to identify CSPs. Benchmarking control system 310 may store address information associated with each CSP.

For each CSP, benchmarking control system 310 may perform a discovery process in order to determine the CSP compute shapes available. In an embodiment, to perform this determination, benchmarking control system 310 may use available CSP Application Programing Interfaces (APIs), Software Development Kits (SDKs) or Command Line Interfaces (CLIs) to query each CSP and receive responses indicating each possible CSP compute shape available. Such a query may also extract other information, such as per hour pricing for each CSP shape, global regions where the shape is or is not available to enterprises, and so on. Benchmarking control system 310 may additionally or alternatively scrape CSP compute shapes and/or additional information from the Internet (e.g., from a website of the CSP and associated websites). Benchmarking control system 310 may store the CSP shapes and their associated data into the benchmarking results database 350 and/or the CSP shape parameter database. Benchmarking control system 310 may periodically, a-periodically, or responsive to a trigger re-perform the discovery process. For example, responsive to determining that a new CSP is available, benchmarking control system 310 may perform the discovery process on that new CSP. As another example, once per month benchmarking control system 310 may re-perform the discovery process and update the stored information to reflect any changes. As yet another example, responsive to detecting a new CSP shape from a CSP (e.g., by way of a web scraping operation), benchmarking control system 310 may re-perform the discovery process.

Following the discovery of CSP shapes, benchmarking control system 310 may launch CSP instances on each CSP 320 (e.g., using instance module 231). The CSP instances may be launched iteratively, in parallel, or a combination of both. A launch may be performed by using a CSP API, SDK, CLI and/or cloud orchestration tool such as Terraform to create a compute instance in the target cloud environment (e.g., by commanding CSP 320 to do so).

Each launched instance 330 may be assigned a unique ID by the CSP 320 upon creation. When the instance 330 is ready for use by the Benchmarking Control System 310, the CSP 320 will provide for a remote means of communicating with the newly created resource. This may be done through the Secure Shell protocol (SSH), or any other means of remote command execution and communication. In a case where SSH or another applicable protocol is used, the CSP 320 may deposit a cryptographic public key on the remote compute instance, to authenticate the benchmarking control system 310 during SSH authentication. Connectivity to the remote instance may be accomplished through public internet protocol (IP) access, private IP through the use of virtual private network (VPN), through a cloud specific privileged access management service, and so on. For example, AWS Session Manager allows for centralized access control to instances using the AWS Identity and Access Management (IAM) platform.

Benchmarking control system 310 records launched instances 330 to allow for follow on steps and for eventual cleanup (e.g., de-commissioning launched instances) after benchmarking is complete and benchmark data is extracted. In addition to creating a launch instance 330, some benchmarking tasks may be improved by using a separate testing instance 340 to perform specific measurements. Testing instance 340 can be launched during a benchmarking cycle (e.g., once per benchmarking cycle) and does not require a re-launch for every new instance 330. Testing instance 340 is advantageous in that compute resources for generating testing conditions are not taken away from a launched instance 330 thus rendering more accurate results. For example, benchmarking performance of launched instance 330 during a data query will be more accurate if testing instance 340, rather than launched instance 330, generates the query, as this more accurately simulates how 330 will respond to such a query. As another example, testing instance 340 may be used to measure Local Area Network (LAN) latency from within a CSP's low latency private network. Additional details around Testing instance 340 are provided in various use case examples shown in Table 2 above.

When a launched instance 330 is deployed on a given CSP 320 and ready for use, benchmarking software may be installed onto the launched instance 330. Benchmarking software may include a set of tools (which may be proprietary and open source) that will stress resources of a remote system and calculate the computers output over time. Benchmarking tools test the system performance attributes on instance 330 and may store the result to be transmitted to the benchmarking control system 310. The performance attributes may include performance attributes of various groupings, such as compute performance groupings, memory groupings, disk IO groupings, network performance groupings, specialized processor performance groupings, and so on. These groupings may include various performance attributes, including, but not limited to, compute performance (e.g., Integer, FP, threads, crypto operations), memory (e.g., read/write operations), disk I/O (e.g., read/write/seek operations), network performance (e.g., throughput, latency, jitter), specialized processor performance (e.g., GPU, secure memory enclaves, others), and so on.

Benchmarking tests may be executed for an extended period of several hours or more. Based on the requested CSP Shape, the CSP may throttle individual shapes after a specific time-period. Throttling is seen when CSP Shapes are considered burstable and consistent performance is not guaranteed. When a complete set of benchmarking results are collected by benchmarking control system 310, benchmarking control system 310 may transform the results into a machine-readable format such as a CSV file, JSON file or XML file. In an embodiment, each row in the data set represents 1 benchmark run, for a specific CSP shape.

In an embodiment, the benchmark data may optionally be normalized before further analysis is performed thereon. In such an embodiment, the data may be encoded as a data vector with each column normalized according to one or more machine learning normalization techniques. Normalization may be performed by benchmarking control system 310 in order to treat each attribute as equal, thus avoiding skewing results based on individual benchmark attribute scaling. In machine learning terms, each benchmark attribute may be considered a feature of the ML model. Applicable feature normalization techniques include Min-Max Scaling, Standardization and Scaling to Unit Length, though any normalization technique may be used.

Min-Max scaling may be represented by the following equation:

$$x' = \frac{x - \min(x)}{\max(x) - \min(x)},$$

where x represents the original feature value and x' represents the normalized value. Using this method, data is transformed to a scale of [0-1]. For example, given a feature vector of x=[1, 2, 3] the min-max scaled representation is [0, 0.5, 1]. Using another example, the mean normalization method of scaling is represented by the equation:

$$x' = \frac{x - \text{average}(x)}{\max(x) - \min(x)},$$

where x represents the original feature value and x' represents the normalized value. Using the example vector of x=[1, 2, 3] the mean normalization method yields x'=[−0.5, 0, 0.5]

These are 2 examples of feature normalization. While not a mandatory step, the application of normalization may yield more accurate grouping results in further steps. The normalized values of computed benchmarks for each instance may be stored in the Benchmark Results Database 350.

Each benchmark result be stored in the Benchmarking Results Database 350. Benchmarking control system 310 may command CSP 320 to terminate CSP Instance 330 (e.g., using API/SDK/CLI calls to the CSP 320). Similarly, benchmarking control system 310 may command CSP 320 to terminate testing instance 340 when a condition is reached (e.g., responsive to determining that all CSP shapes 320 have been enumerated and tested for a given geographical region). CSP instance 330 and testing instance 340 may be re-launched by benchmarking control system 310 for further testing at a subsequent time in order to update benchmark performance.

After benchmarking is complete, a user 380 may interface with recommendation rendering system 370 to request a recommendation of a cloud shape. Recommendation rendering system 370 may be a module interacting with ranking module 234, and may receive input from a user of one or more parameters. Recommendation rendering system 370 may query pricing and recommendation database for CSP shapes that satisfy the one or more input parameters, and may rank the matching CSP shapes and provide based thereon a recommendation to user 380. Further discussion of how recommendations are formed is discussed below with reference to FIGS. 4-6.

Data Analysis and Clustering of CSP Shapes Based on Benchmark Information

Whether or not the data is normalized, grouping module 233 performs a data analysis on the benchmark data, which results in a grouping of similar performing CSP shapes, as well as an assignment of a Cast Shape label to each CSP shape. In an embodiment, ranking module 234 ranks the CSP shapes in order based on a selected metric. For example, the metric selected may be best cost/utilization performance relative to each Cast Shape, in which case the system may rank the CSP shapes for each cast shape based on that metric.

To perform the grouping, grouping module 233 may utilize one or more machine learning models for clustering. Examples of applicable clustering algorithms include but are not limited to K-Means Clustering, Mean-Shift Clustering, Density-Based Spatial Clustering of Applications with Noise (DBSCAN), Expectation-Maximization (EM) Clustering using Gaussian Mixture Models (GMM), and so on.

K-Means is a clustering algorithm, where K is a preselected number of groups or clusters. This works well when the number of groups has been identified. For example, this system may start with the assumption that there are 6 groups of CSP shapes. K-Means will sort each CSP shape into one of the predefined shapes. K-Means uses distance between each data point and randomly selected centroid points in N dimensional space. Centroid points move as data points are assigned to a cluster based on distance, and then the centroid is recomputed. K-Means is relatively fast with linear time complexity of O(n).

Figure 4:
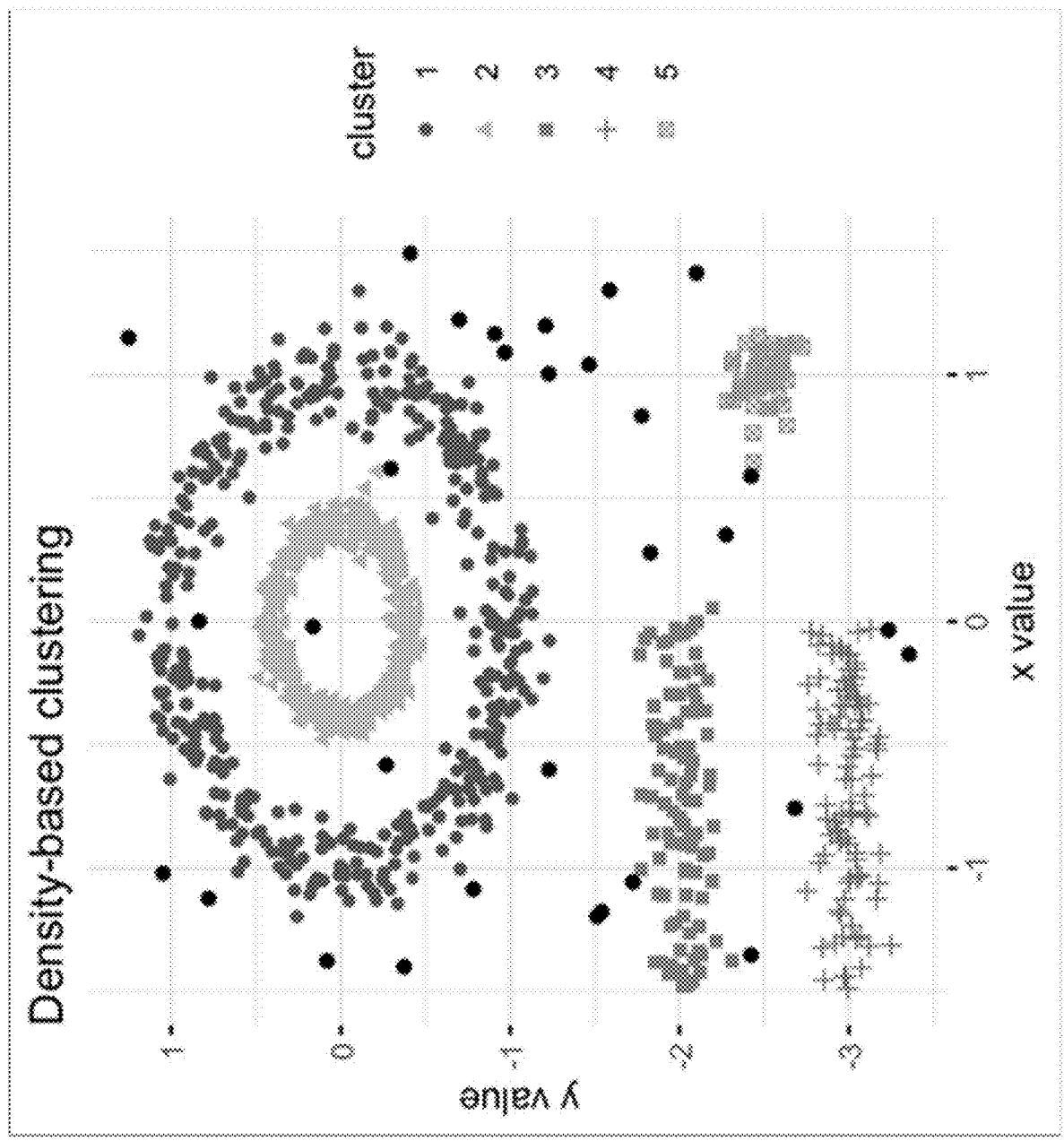
FIG. 4 illustrates one embodiment of an illustration of clustering CSP shapes to identify different groups of CSP shapes.

DBSCAN in contrast does not require a pre-selected number of groups. The algorithm discovers the number of clusters that naturally fit the input data provided. DBSCAN also has the advantage of identifying outliers and can throw away noisy data points to avoid skewing the final clustering determination. DBSCAN has time complexity of O(n^2). FIG. 4 illustrates one embodiment of an illustration of clustering CSP shapes to identify different groups of CSP shapes. As shown in clustering graph 400, grouping module 233 applied the benchmarking data for each benchmarked CSP shape to a DBSCAN machine learning model, and the output of the machine learning model includes five different clusters and some outliers. Each of the five clusters represents a grouping of CSP shapes that will be grouped together as a same Cast shape. While FIG. 4 depicts a DBSCAN 5-cluster example in two dimensions, this is merely exemplary.

In some embodiments, grouping module 233 may utilize a statistical model that groups the CSP shapes based on statistical similarities. Grouping module 233 may determine correlations between benchmark data of different CSP shapes, and may determine CSP shapes that are highly correlated (e.g., have a correlation within at least a threshold distance from one another). For example, CPU measurements for floating point arithmetic may be correlated to encryption algorithm performance.

In the case where several features are highly correlated, it may be useful to reduce the dataset into components that represent the data with fewer dimensions. Principal Component Analysis (PCA) is a technique for reducing the dimensionality of such datasets as are collected in during benchmarking. PCA increases interpretability but at the same time minimizing information loss. PCA is an optional tool that may lead to better runtime performance while maintaining cluster accuracy.

Ranking and Publishing CSP Shape Recommendations

Figure 5:
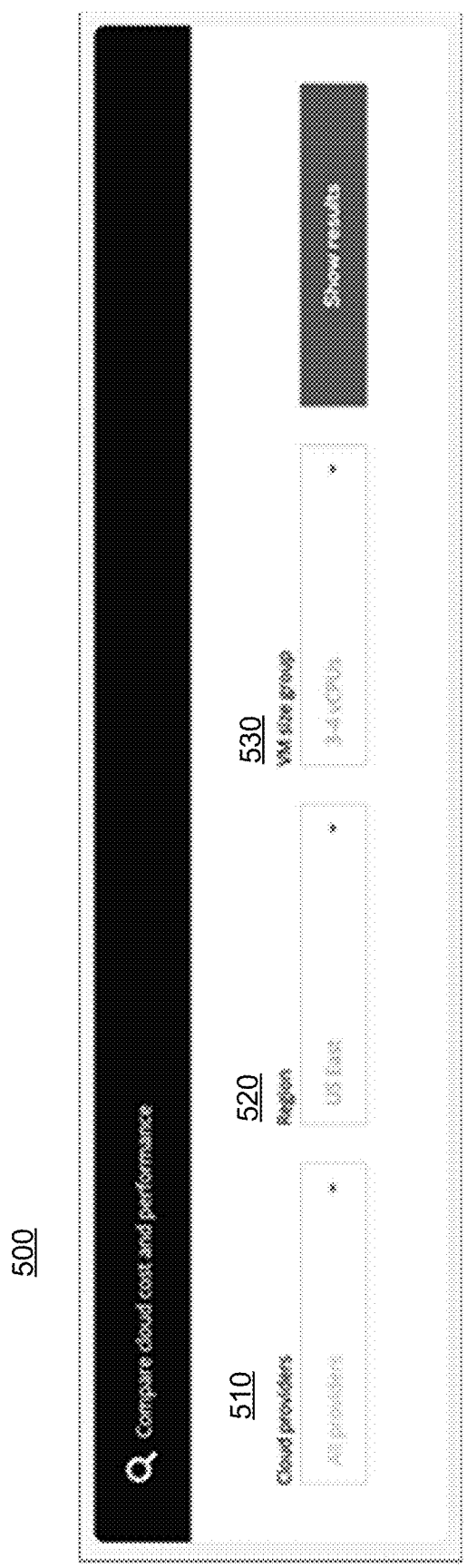
FIG. 5 illustrates one embodiment of an exemplary user interface for inputting search terms to compare CSP shapes offered by various CSPs.

FIG. 5 illustrates one embodiment of an exemplary user interface for inputting search terms to compare CSP shapes offered by various CSPs. As depicted in FIG. 5, user interface 500 includes various selectable options, including CSP provider option 510, region option 520, and VM size group option 530. These options are merely exemplary, and any other option may be presented within user interface 500 (e.g., hardware and software requirements, memory capacity, memory type or brand, Cast shape, and so on). CSP Shape Evaluation Tool 130 may present user interface 500 to a user of a client device 110 via application 111.

FIG. 6 illustrates one embodiment of an exemplary user interface showing recommendations of CSP shapes based on the search terms. User interface 600 shows recommended CSP shapes based on input into user interface 500. The recommendations may include CSP shapes of a given grouping (e.g., as determined by grouping module 233) that best satisfy the user-input search parameters. The recommendations may be organized based on any given parameter. In an embodiment, the user may select the parameter that drives the recommendations in user interface 500. In another embodiment, CSP shape evaluation tool 130 may provide the recommendation using a default formulation (e.g., on the basis of cost, performance, any other parameter discussed herein, or a combination thereof. User interface 600 may include an indication of a tag showing why one or more CSP shapes are recommended (e.g., "best price", "best performance", etc.). The recommendations may be ranked according to the user-selected parameter or the user formulation by ranking module 234.

In the example shown in FIG. 6, a 3 CPU instance from CSP "Digital Ocean" is shown to be the best choice, as its cost is significantly lower than similar CSP shapes. The recommended shape is slower than the top performing shape provided by "Oracle Infrastructure" however it's overall price-performance ratio is better. The recommendation may be configured to offer different alternatives given other factors that may be more desirable than cost or performance as in the example. For example, availability or uptime may be factors that may be analyzed as higher priority over cost and performance. The rendered recommendations allow users to make decisions about which compute instances to use for their cloud workloads, based on data-driven cost-performance and machine learning based clustering of CSP shapes.

Computing Machine Architecture

Figure 7:
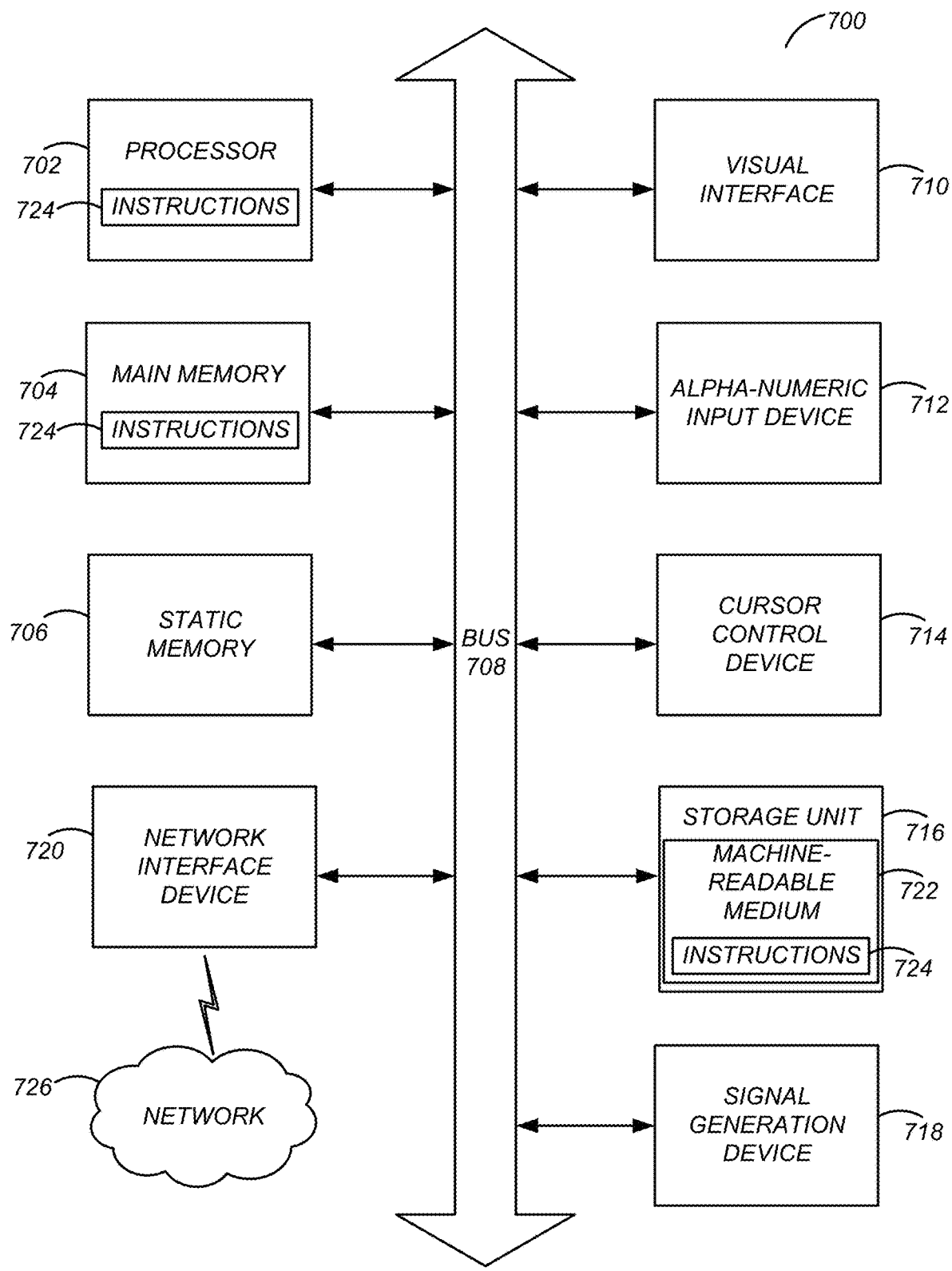
FIG. 7 is a block diagram illustrating components of an example machine able to read instructions from a machine-readable medium and execute them in a processor (or controller).

FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alpha-numeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Exemplary CSP Evaluation and Recommendation Process

Figure 8:
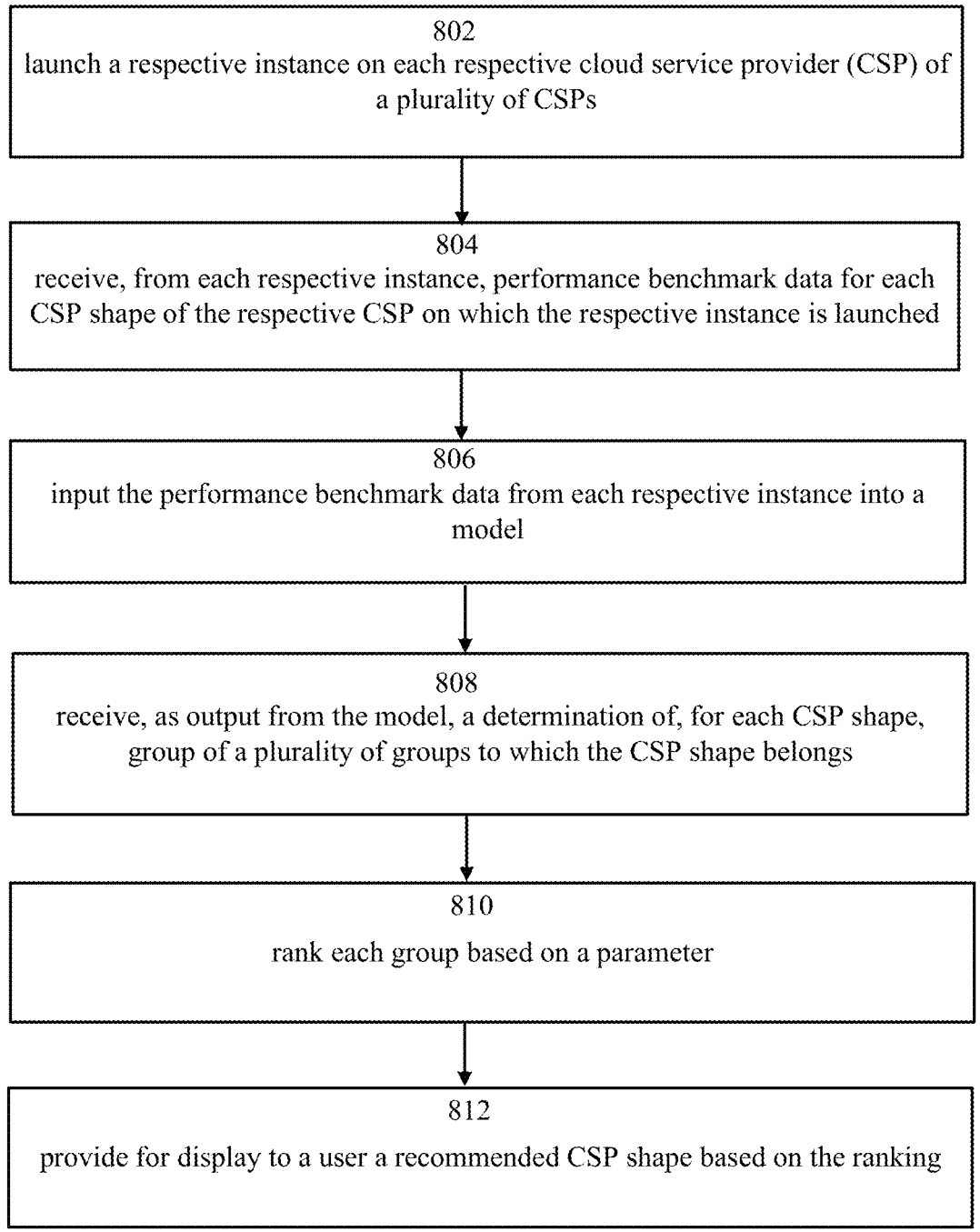
FIG. 8 is an exemplary process diagram including a flowchart for evaluating and recommending CSP shapes, in accordance with an embodiment.

FIG. 8 is an exemplary process diagram including a flowchart for evaluating and recommending CSP shapes, in accordance with an embodiment. Process 800 begins with one or more processors 702 of CSP shape evaluation tool 130 launching 802 (e.g., using instance module 231) a respective instance (e.g., launch instance 330) on each respective cloud service provider (CSP) of a plurality of CSPs (e.g., CSP 320). CSP shape evaluation tool 130 receives receive 804, from each respective instance, performance benchmark data for each CSP shape of the respective CSP on which the respective instance is launched (e.g., where the benchmark data is obtained using benchmark module 232).

CSP shape evaluation tool 130 inputs 806 the performance benchmark data from each respective instance into a model (e.g., a machine learning model or a statistical model of model database 241), and receives 808, as output from the model, a determination of, for each CSP shape, group of a plurality of groups to which the CSP shape belongs (e.g., using grouping module 233). CSP shape evaluation tool 130 ranks 810 each group based on a parameter (e.g., using ranking module 234) and provide 812 for display to a user a recommended CSP shape based on the ranking (e.g., using user interface 600).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for benchmarking, grouping, and recommending CSP shapes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer-readable medium comprising instructions encoded thereon that, when executed by at least one processor, cause the at least one processor to:
    launch a respective instance on each respective cloud service provider (CSP) of a plurality of CSPs, the plurality of CSPs including two or more distinct CSPs;
    receive, from each respective instance, performance benchmark data for each CSP shape of the respective CSP on which the respective instance is launched;
    input the performance benchmark data from each respective instance into a model;
    receive, as output from the model, a determination of, for each CSP shape, group of a plurality of groups to which the CSP shape belongs;
    rank each group based on a parameter; and
    provide for display to a user a recommended CSP shape based on the ranking, the recommended CSP shape implemented using one of the two or more distinct CSPs.

2. The non-transitory computer-readable medium of claim 1, wherein the model is an unsupervised machine learning model or a statistical model.

3. The non-transitory computer-readable medium of claim 1, wherein the performance benchmark data is normalized prior to being input into the model.

4. The non-transitory computer-readable medium of claim 1, wherein instructions to input the performance benchmark data from each respective instance into the model comprise instructions to:
    reduce the performance benchmark data into a reduced data set having fewer dimensions than the performance benchmark data; and
    input the reduced data set into the model.

5. The non-transitory computer-readable medium of claim 4, wherein instructions to reduce the performance benchmark data into a reduced data set comprise instructions to perform a principal component analysis on the performance benchmark data.

6. The non-transitory computer-readable medium of claim 1, wherein each respective instance is a respective launch instance, and further comprises instructions that when executed causes the processor to:

launch a respective testing instance on each respective cloud service provider (CSP) of the plurality of CSPs; and generate at least a portion of the performance benchmark data using the respective testing instances.

7. The non-transitory computer-readable medium of claim 1, wherein further comprises instructions that when executed causes the processor to:

generate for display to the user a plurality of selectable options, each selectable option corresponding to a parameter; and receive a selection of a selectable option corresponding to a given parameter, wherein instructions to provide for display the recommended CSP shape based on the ranking further comprises instructions that when executed causes the processor to provide for display a ranked list of CSP shapes corresponding to the given parameter, the recommended CSP shape being at a top of the ranked list.

8. A method comprising:

launching a respective instance on each respective cloud service provider (CSP) of a plurality of CSPs, the plurality of CSPs including two or more distinct CSPs;

receiving, from each respective instance, performance benchmark data for each CSP shape of the respective CSP on which the respective instance is launched;

inputting the performance benchmark data from each respective instance into a model;

receiving, as output from the model, a determination of, for each CSP shape, group of a plurality of groups to which the CSP shape belongs;

ranking each group based on a parameter; and providing for display to a user a recommended CSP shape based on the ranking, the recommended CSP shape implemented using one of the two or more distinct CSPs.

9. The method of claim 8, wherein the model is an unsupervised machine learning model or a statistical model.

10. The method of claim 8, wherein the performance benchmark data is normalized prior to being input into the model.

11. The method of claim 8, wherein inputting the performance benchmark data from each respective instance into the model comprises:

reducing the performance benchmark data into a reduced data set having fewer dimensions than the performance benchmark data; and inputting the reduced data set into the model.

12. The method of claim 11, wherein reducing the performance benchmark data into a reduced data set comprises performing a principal component analysis on the performance benchmark data.

13. The method of claim 8, wherein each respective instance is a respective launch instance, and wherein the method further comprises:

launching a respective testing instance on each respective cloud service provider (CSP) of the plurality of CSPs; and generating at least a portion of the performance benchmark data using the respective testing instances.

14. The method of claim 8, further comprising:

generating for display to the user a plurality of selectable options, each selectable option corresponding to a parameter; and receiving a selection of a selectable option corresponding to a given parameter, wherein providing for display the recommended CSP shape based on the ranking comprises providing for display a ranked list of CSP shapes corresponding to the given parameter, the recommended CSP shape being at a top of the ranked list.

15. A system comprising:

an instance module for launching a respective instance on each respective cloud service provider (CSP) of a plurality of CSPs, the plurality of CSPs including two or more distinct CSPs;

a benchmark module for receiving, from each respective instance, performance benchmark data for each CSP shape of the respective CSP on which the respective instance is launched;

a grouping module for:

inputting the performance benchmark data from each respective instance into a model; and receiving, as output from the model, a determination of, for each CSP shape, group of a plurality of groups to which the CSP shape belongs; and a ranking module for:

ranking each group based on a parameter; and providing for display to a user a recommended CSP shape based on the ranking, the recommended CSP shape implemented using one of the two or more distinct CSPs.

16. The system of claim 15, wherein the model is an unsupervised machine learning model or a statistical model.

17. The system of claim 15, wherein the performance benchmark data is normalized prior to being input into the model.

18. The system of claim 15, wherein inputting the performance benchmark data from each respective instance into the model comprises:

reducing the performance benchmark data into a reduced data set having fewer dimensions than the performance benchmark data; and inputting the reduced data set into the model.

19. The system of claim 18, wherein reducing the performance benchmark data into a reduced data set comprises performing a principal component analysis on the performance benchmark data.

20. The system of claim 15, wherein each respective instance is a respective launch instance, wherein the instance module is further for launching a respective testing instance on each respective cloud service provider (CSP) of the plurality of CSPs, and wherein the benchmark module is further for generating at least a portion of the performance benchmark data using the respective testing instances.

* * * * *